Patented Mar. 21, 1939

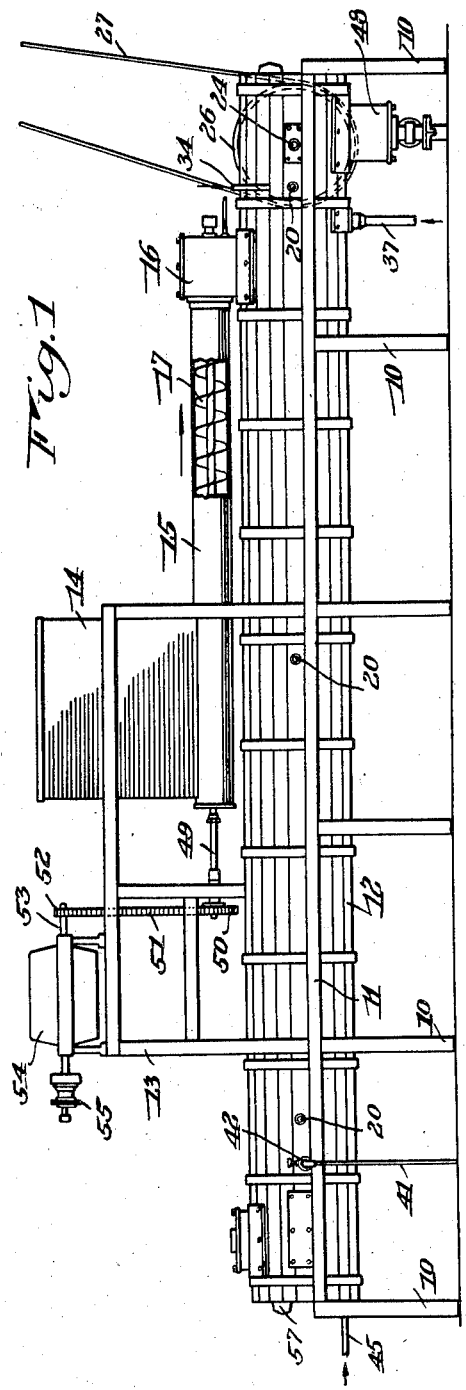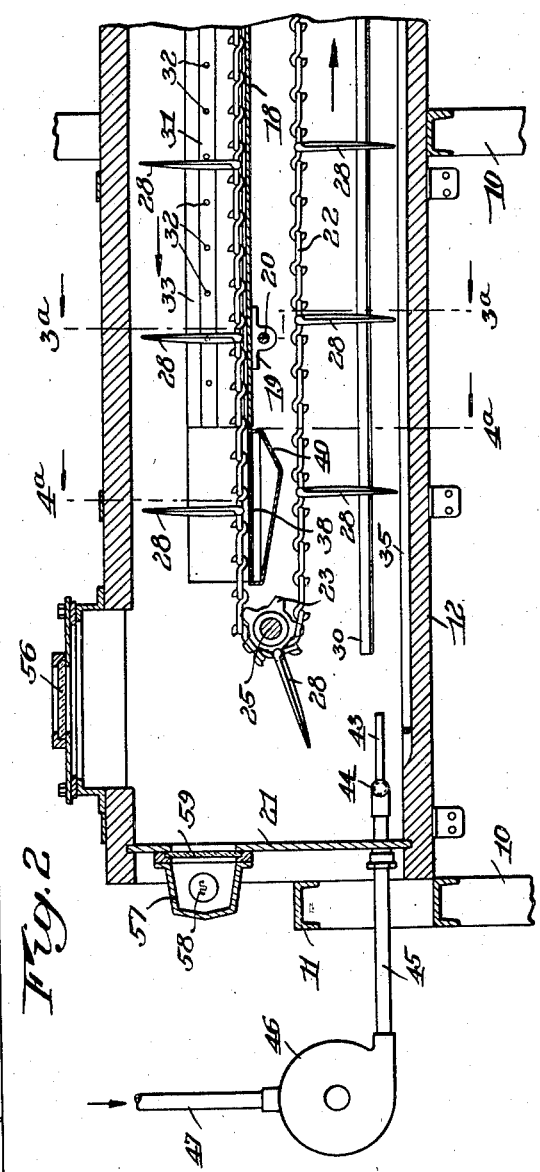

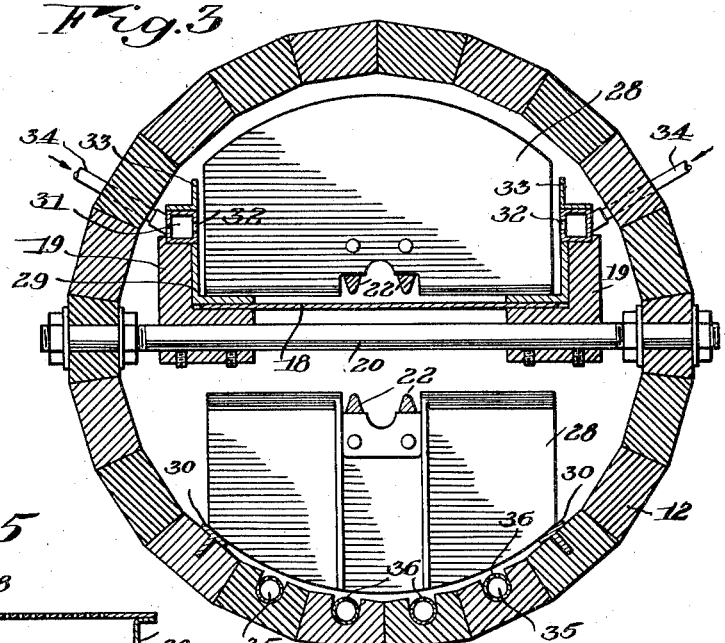
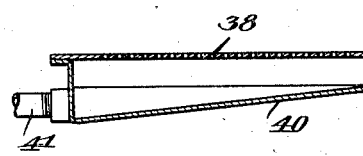
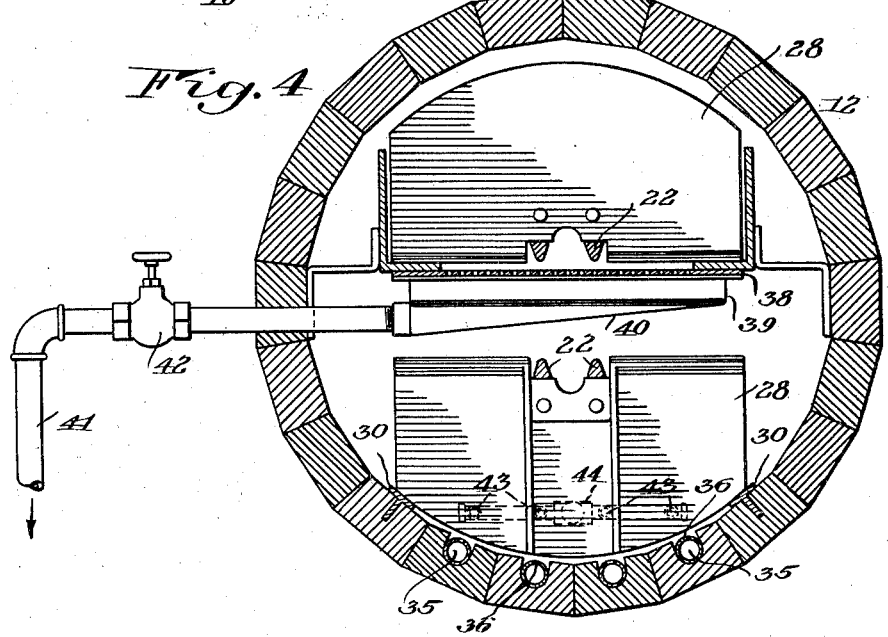

2,151,623

UNITED STATES PATENT OFFICE 2,151,623

APPARATUS FOR MAKING FRUIT PRODUCTS

William A. Smith, Lyndonville, N. Y.

Original application June 23, 1937, Serial No. 149,933, now Patent No. 2,135,629, dated November 8, 1938. Divided and this application July 29, 1938, Serial No. 222,005

14 Claims. (Cl. 53—18)

This invention relates to apparatus for making cooked fruit products such, for example, as apple or other fruit juices, and is a division of my copending application, Serial No. 149,933, filed June 23, 1937, on Method for making fruit products, issued on Nov. 8, 1938, as Patent Number 2,135,629.

An object of my invention is to provide an apparatus for making a food product, such as apple sauce, which is more simple and economical and adapted to make a product of improved quality.

Another object of my invention is to provide an apparatus capable of carrying out a more convenient and inexpensive method of manufacturing such products as apple sauce with the use of a syrup instead of dry sugar as a sweetening means for the apple sauce.

More specifically my invention contemplates an apparatus adapted to carry out the method disclosed in the above mentioned application, the apparatus comprising means for continuously moving a food product, such as apple sauce, through a regulated flow of steam to progressively moisten and cook it; the provision of means for removing the excess moisture from the apple sauce preferably prior to the introduction of sweetening means such as syrup to the apple sauce; the provision of means for introducing the syrup into the apple sauce and the provision of means for continuously cooking while conveying the apple sauce through the drum or other receptacle in which the fruit product is cooked.

To these and other ends the invention resides in certain improvements and combinations of parts, all as will be hereinafter more fully described, the novel features being pointed out in the claims at the end of the specification.

In the drawings:

Fig. 1 is a side elevation of an apparatus for carrying out the present invention;

Fig. 2 is an enlarged vertical section of a portion of said apparatus;

Fig. 3 is an enlarged sectional view on the line 3a—3a in Fig. 2;

Fig. 4 is an enlarged section on the line 4a—4a in Fig. 2, and

Fig. 5 is a sectional view of a moisture collecting means shown in Fig. 4.

The same reference numerals throughout the several views indicate the same parts.

Reference is hereby made to my following United States prior patents: No. 1,523,843, issued January 20, 1925, entitled Machine for preparing food compounds; No. 1,627,466, issued May 3, 1927, entitled Method of preparing food substances; and No. Re. 17,308, issued May 28, 1929, entitled Method of preparing food substances. My present invention relates to apparatus for carrying out the method described and claimed in my United States patent, No. 2,135,629, issued November 8, 1938, entitled Method for making fruit products. The method disclosed in said last-mentioned patent involves the removal of part or all of the water formed from the condensed steam used to preliminarily heat and cook the fruit. The excess moisture is preferably removed prior to the formation of any substantial amount of fruit juices so that no or little loss of fruit juices is occasioned upon draining off the moisture. Preferably also, the method described in said patent involves the use of a syrup instead of dry sugar as a sweetening agent. The use of syrup as compared to the use of dry sugar as a sweetening agent, naturally results in the fruit containing a greater quantity of moisture. The use of the draining treatment enables not only the use of syrup as a sweetening agent, but also enables the accurate control of the moisture content of the finished fruit product whether or not a syrup is used as a sweetening agent.

The apparatus of my invention adapted to carry out the method of making a food product described in said patent, No. 2,135,629, and briefly mentioned above, such as apple sauce, comprises an elongated cooking container or drum 12 preferably of generally cylindrical shape which is mounted on standards 10 and a frame 11. On an upward extension 13 of the frame is a hopper 14 for the fruit cuttings communicating at its bottom with a cylindrical trough 15 extending rearwardly above and parallel with the cooking drum 12. The rear end of the trough 15 communicates with a casing 16 mounted on and discharging through an opening in the top of the drum. Within the trough 15 is a worm 17 extending at its forward end under the discharge from hopper 14 to advance the fruit through the trough into the casing 16 at its rear end and the casing may contain suitable valve means (not shown) to be opened by the advancing fruit, but to be closed by a spring or the pressure of the steam in the cooking drum when the flow of fruit ceases, as disclosed, for example, in my said Patent No. 2,081,512, but forming no part of the present invention.

Within the drum 12 and substantially midway of its height is a table 18 supported on brackets 19 on transverse rods 20 mounted at their ends in the sides of the drum. Table 18 extends at its rear end under the opening from casing 16 through which the fruit is supplied to the drum, and its forward end extends to a point adjacent but spaced from the forward end 21 of the drum. As the apple cuttings are supplied through trough 15 and casing 16 to the cooking drum, they fall on the rear end of table 18, and means is provided for progressively advancing the fruit to the opposite or forward end of the table where it is discharged to the bottom of the drum and then moved rearwardly by the feeding means to the point of discharge at the rear end of the bottom of the drum.

The means for advancing or feeding the fruit through the cooking drum comprises preferably a continuous sprocket chain 22 running at its ends over similar sprocket wheels, one of which is shown at 23 (Fig. 2). The sprocket wheels are fixed on transverse shafts 24 and 25 rotating at their ends in bearings on the sides of the drum. Shaft 24 at the rear end of the machine carries a pulley 26 driven by a belt 27 from any suitable source of power. Fixed on the chain are spaced blades 28 which move the fruit first forwardly along table 18, over its forward end to the bottom of the drum, and then rearwardly along the latter to the discharge outlet. Table 18 and brackets 19 preferably carry superposed angle bars 29 on which the inner edges of blades 28 rest and are guided in their movement so that their bottom edges sweep along close to the table 18. As the blades pass around sprocket 23 and move rearwardly along the bottom of the drum their outer edges slide along and are supported by T bars 30 in the drum wall, so that the blades sweep near but without scraping the drum.

The means for heating and cooking the fruit preferably comprises a series of steam conduits or pipes provided with openings for directing jets of steam directly into contact with the fruit, as it is progressively advanced through the cooking drum. Such steam pipes are provided above and adjacent the table 18, in the present instance in the form of the rectangular conduits 31 having the jet openings 32 for injecting currents of steam into the fruit as it is moved along the table. Supported on such pipes are angle bars 33 for increasing the depth of the channel formed by the table and its sides. The steam is supplied to the pipes 31 through the supply lines 34.

The fruit is additionally heated and cooked as it is moved rearwardly along the bottom of the drum, preferably by the continued injection of steam. For this purpose the inner surface of the bottom of the drum has embedded therein a series of parallel pipes 35 extending longitudinally of the drum as shown and having perforations 36 for directing jets of steam into the fruit as it is moved along the bottom of the drum. Pipes 35 are supplied through a steam line 37.

The means for withdrawing excess moisture from the fruit during the heating process is preferably located at the forward end of the table 18. As the fruit cuttings are discharged upon and moved along the table, they are subjected to preliminary heating by the steam from the jets 32 to bring them up to cooking temperature. Such steam is condensed by the relatively cold fruit as it is progressively brought up to cooking temperature, but at the forward end of the table 18 the fruit cuttings are not sufficiently cooked to give off any substantial amount of juices and the liquor at that point is mainly the condensate from the heating steam. The means for removing excess moisture, therefore, may be conveniently located at this point and comprises, in the present instance, a collector in the form of a perforated plate 38 (Figs. 2, 4, and 5) arranged as an extension of the table 18. Beneath the drainage plate 38 is a trap or box 39 having an inclined bottom 40 discharging into an outlet pipe 41 controlled by a valve 42 which may be adjusted to maintain a level of water in the trap 39 to prevent the escape of steam. By this means, as the fruit cuttings are fed over plate 38, the excess moisture drains off through the openings in the plate and is removed without interruption of the process and the amount of moisture so removed may be controlled by means of the discharge valve 42. The fruit is then discharged downwardly over the forward end of plate 38 and falls, as stated, to the bottom of the front end of the cooking drum for continued heating and cooking as it is moved rearwardly along the drum.

The means for supplying syrup for sweetening the product preferably comprises one or more relatively small pipes 42, 43 projecting rearwardly toward the fruit from a manifold 44 in the forward end of the drum. The manifold is supplied, in turn, through a pipe 45 from a pump 46 of any suitable type connected to a syrup container. The supply line may be controlled by suitable valve means (not shown), as well as by the speed of the pump 46, to inject the syrup at a rate proportional to the rate of feed of the fruit cuttings and in accordance with the degree of sweetening required. The fruit and syrup are moved rearwardly along the bottom of the drum through the jets of steam described above and are gently stirred and mixed by the feeding movement, as well as by the force of the impinging jets of steam. The syrup is thus mixed with the hot fruit in a suitable state of moisture and the mixture is thoroughly cooked by the time it reaches the rear end of the drum. At that point it falls through a discharge opening into a casing 48 from which it passes through suitable piping to the pulper or other equipment by which it is broken up, screened and fed in a homogeneous state to the cans, as well understood in the art. It will be apparent, however, that after the excess moisture has been removed by the collecting means described, either dry sugar may be introduced by feeding means such as described in my prior patents, or syrup may be introduced and mixed with the fruit, at any desired point in the subsequent cooking, or even after the product is cooked. By such means the moisture content of the product may be controlled in accordance with varying conditions so as to prevent excess moisture and the thinning of the product, notwithstanding the use of a sweetening syrup.

The worm 17 for feeding the fruit from the hopper 14 to the cooking drum may be driven in any suitable manner as by extending its shaft 49 forwardly and providing it with a sprocket wheel 50 driven by a chain 51 from a sprocket 52 on the shaft 53 of a change speed gearing indicated generally at 54 and driven by any suitable means connected with the sprocket 55. The cooking drum may be provided with various convenient accessories, such as an inspection window 56 and a housing 57 for a lamp 58, by means of which the interior may be lighted through a window 59, as more fully described in my said Patent No. 2,081,512, but forming no part of the present invention.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. An apparatus for making a cooked fruit product, comprising a container, a conduit for injecting steam thereinto, feeding means for moving the fruit through said steam, a collector for collecting and removing a portion of the moisture in said fruit, and a conductor located in the path of movement of the fruit beyond said collector for supplying syrup to said fruit to sweeten the same.

2. An apparatus for making a cooked fruit product, comprising a container, conduit means for injecting steam into said container, feeding means for moving the fruit through said steam to moisten and cook the same, a collector provided with drainage openings in the path of movement of said fruit for collecting and separating a portion of the moisture therein, and a conductor located at a point in the path of movement of the fruit beyond said collector for supplying syrup to said fruit to sweeten the same.

3. An apparatus for making a cooked fruit product, comprising a container, conduit means for injecting steam into said container, propelling and agitating means for moving the fruit through said steam to moisten and cook the same, said container having a member mounted therein provided with drainage openings medially of the path of movement of said fruit for separating and removing a portion of the moisture therein, and conducting means located in the path of movement of said fruit beyond said member for supplying syrup to said fruit to sweeten the same.

4. An apparatus for making a cooked fruit product comprising a container, means for injecting steam into the container to cook the fruit, feeding means for moving the fruit through said container, collector means for removing the excess moisture from the partially cooked mass, means for introducing sweetening into the partially cooked mass at a point in the movement of the mass beyond said collector and after the removal of the excess moisture, and means for cooking the fruit as the movement of the fruit through the container is continued.

5. An apparatus for making a cooked fruit product comprising a container having a fruit entrance and a fruit discharge, feeding means for continuously moving a mass of fruit through the container from the fruit entrance to the fruit discharge, means for introducing steam into the container to cook the fruit preliminarily, means comprising a collector over which the fruit is continuously moved during its passage through the container to drain off excess moisture from the fruit, conduit means in the path of movement of the fruit beyond said collector for introducing sweetening into the partially cooked mass, and means beyond said conduit for continuously cooking the fruit substantially until the fruit discharge is reached.

6. An apparatus for making a cooked fruit product comprising a container having a fruit entrance and a fruit discharge, feeding means for continuously moving a mass of fruit through the container from the fruit entrance to the fruit discharge, means for introducing steam into the container to cook the fruit preliminarily, means comprising a collector having drain openings through which the excess moisture drains by gravity as the fruit is continuously moved over it, conduit means in the path of movement of the fruit beyond said collector for introducing sweetening into the partially cooked mass, and means beyond said conduit for continuously cooking the fruit substantially until the fruit discharge is reached.

7. An apparatus for making a cooked fruit product comprising a container having a fruit entrance and a fruit discharge, feeding means for continuously moving a mass of fruit through the container from the fruit entrance to the fruit discharge, means for introducing steam into the container to cook the fruit preliminarily, means comprising a collector and a drain pipe connected to said collector over which the fruit is continuously moved to drain off excess moisture, said drain pipe having means therein for controlling the amount of moisture drained off the fruit, conduit means in the path of movement of the fruit beyond said collector for introducing sweetening into the partially cooked mass, and means beyond said conduit for continuously cooking the fruit substantially until the fruit discharge is reached.

8. An apparatus for making a cooked fruit product comprising a container having a fruit entrance and a fruit discharge, feeding means for continuously moving a mass of fruit through the container from the fruit entrance to the fruit discharge, means for introducing steam into the container to cook the fruit preliminarily, means comprising a collector having a conduit connected thereto over which the fruit is continuously moved to drain off excess moisture from the fruit, said conduit having a liquid seal for preventing escape of steam from the container, conduit means in the path of movement of the fruit beyond said collector for introducing sweetening into the partially cooked mass, and means beyond said conduit for continuously cooking the fruit substantially until the fruit discharge is reached.

9. An apparatus for making a cooked fruit product comprising a container having a fruit entrance and a fruit discharge, feeding means for continuously moving a mass of fruit through the container from the fruit entrance to the fruit discharge, means for introducing steam into the container to cook the fruit preliminarily, means comprising a collector having drain openings over which the fruit is continuously moved to drain off excess moisture and through the openings of which the excess moisture flows by gravity, a conduit connected to said collector, said conduit having a valve for regulating the amount of moisture withdrawn from the fruit, conduit means in the path of movement of the fruit beyond said collector for introducing sweetening into the partially cooked mass, and means beyond said conduit for continuously cooking the fruit substantially until the fruit discharge is reached.

10. An apparatus for making a cooked fruit product comprising a container having a fruit entrance and a fruit discharge, feeding means for continuously moving a mass of fruit through the container from the fruit entrance to the fruit discharge, means for introducing steam into the container to cook the fruit preliminarily, means comprising a collector having drain openings over which the fruit is continuously moved to drain off excess moisture and through the openings of which the excess moisture flows by gravity, a conduit connected to said collector, said conduit having a valve for regulating the amount of moisture withdrawn from the fruit and said conduit having a liquid seal to prevent the escape of steam from the container, conduit means in the path of movement of the fruit beyond said collector for introducing sweetening into the partially cooked mass, and means beyond said conduit for continuously cooking the fruit substantially until the fruit discharge is reached.

11. An apparatus for making a cooked fruit product comprising a container, a collector having drain openings over which the fruit is moved so that the excess moisture drops by gravity through the drain openings, means for cooking the fruit while in the container and means for moving the fruit over said drain openings.

12. An apparatus for making a cooked fruit product comprising a container in which the fruit is cooked, a collector having drain openings over which the fruit is moved so that excess moisture drops by gravity through said drain openings, a conduit connected to said collector, said conduit having a valve for regulating the amount of moisture removed from the fruit, means for cooking the fruit while in the container and means for moving the fruit over said drain openings.

13. An apparatus for making a cooked fruit product comprising the combination of a container in which the fruit is cooked, means in said container for automatically and substantially continuously removing excess moisture from the fruit as it is cooked, and means for cooking the fruit in the container.

14. An apparatus for making a cooked fruit product comprising the combination of a container in which the fruit is cooked, means in said container for automatically and substantially continuously removing excess moisture from the fruit as it is cooked, means for cooking the fruit in the container, and means for substantially continuously feeding the fruit through the container while cooking.

WILLIAM A. SMITH.